United States Patent [19]

Zentner et al.

[11] 4,454,294

[45] Jun. 12, 1984

[54] POLYVINYL CHLORIDE FILM HAVING SPECIFIC PROPERTIES, AND A PROCESS FOR ITS MANUFACTURE

[75] Inventors: Erich Zentner, Burgkirchen; Wilhelm Bingemann, Wiesbaden, both of Fed. Rep. of Germany

[73] Assignee: Hoechst Aktiengesellschaft, Fed. Rep. of Germany

[21] Appl. No.: 407,757

[22] Filed: Aug. 13, 1982

[30] Foreign Application Priority Data

Aug. 25, 1981 [DE] Fed. Rep. of Germany ....... 3133507

[51] Int. Cl.³ .............................................. C08J 5/18
[52] U.S. Cl. ................................. 526/344.3; 264/175; 264/290.2
[58] Field of Search ...................... 526/344.3; 264/175, 264/288.4, 290.2, 284, 293

[56] References Cited

U.S. PATENT DOCUMENTS 2,984,593  5/1961  Isaksen ............................. 526/344.3
3,231,557  1/1966  Bauer ............................... 526/344.3
4,247,663  1/1981  Yoshiga ............................ 264/290.2
4,259,285  3/1981  Baumgartl ........................... 264/284
4,379,774  4/1983  Andersen .......................... 264/290.2

Primary Examiner—Paul R. Michl
Attorney, Agent, or Firm—Connolly and Hutz

[57] ABSTRACT

A stretched and delustered film is described which is essentially comprised of vinyl chloride polymers and which has a specific roughness, a specific luster value, a high heat shrinkage in transverse direction and a relatively low heat shrinkage in longitudinal direction and retains the delustered surface texture even on heating up to 140° C. The new film is manufactured by calendering a molding composition essentially comprised of vinyl chloride polymers, and by delustering and transversely stretching the film, the calendering, delustering and transverse stretching being carried out in the order indicated and while maintaining certain process conditions. The new film is particularly suitable for skin packaging purposes.

10 Claims, No Drawings

POLYVINYL CHLORIDE FILM HAVING SPECIFIC PROPERTIES, AND A PROCESS FOR ITS MANUFACTURE

The invention relates to a stretched and delustered polyvinyl chloride film which has a combination of specific physical and visual properties. The invention also relates to a process for manufacturing such films.

Polyvinyl chloride films are admittedly known which are stretched and have a matted (matt and rough) surface, but they do not have the particular combination of physical and visual properties which, as a rule, are required for skin packaging purposes such as the enveloping of regular or irregular bodies, for example bottles having a bulge and neck (wine, champagne and liqueur bottles and the like) or cylindrical tins and cans.

The two German Offenlegungsschriften Nos. 2,910,042 and 2,920,986 disclose highly stretched and hence highly heat-shrinkable films which are based on polyvinyl chloride and which are suitable for skin packaging purposes. However, they have a relatively highly lustrous appearance and do not have the particular surface texture in respect of mattness and roughness which is frequently desirable for visual and esthetic reasons. Moreover, although these films have a high heat shrinkage in the transverse direction, they also have a relatively high shrinkage in the longitudinal direction of the film, which shrinkage has an adverse effect in many cases of skin packaging.

Polyvinyl chloride films for skin packaging purposes should have, in particular, a certain roughness and a certain luster, as well as a defined shrinkage (change in dimension) in the transverse direction (that is transverse to the running direction of the film in its manufacture), but no significant shrinkage in longitudinal direction (that is the running direction of the film in its manufacture or the machine direction) on heating of the film. For shrinkage for skin packaging, the film is generally heated to 140° C., preferably to at least 90° C.

German Utility Model 7,931,547 discloses a biaxially stretched (oriented) and embossed polyvinyl chloride film. This film is used for the manufacture of adhesive tapes and it therefore need not have any specific visual properties.

German Offenlegungsschrift No. 2,833,982 describes a process for embossing films of a molding composition essentially comprised of vinyl chloride polymer, lubricant and stabilizer, for obtaining a uniformly matt and rough film surface. The film, which can originate from a film production unit, such as a calender, flat jet extruder and round jet extruder with a lay flat unit, or from a film stretching or film drawing device, is embossed with the aid of a sand-blasted (depolished) steel roll.

German Offenlegungsschrift No. 2,716,853 discloses a film which has a matt and rough surface and which is obtained by squeezing, by mill kneading/calendering, a molding composition of (a) 10 to 40% by weight of a vinyl chloride polymer having a weight average molecular weight of 110,000 to 190,000, (b) 60 to 90% by weight of a vinyl chloride polymer having a weight average molecular weight of 45,000 to 75,000 and (c) customary stabilizers and lubricants into a film.

In German Auslegeschrift No. 1,504,522, a matt and rough surface, in the case of thermoplastic films, is obtained by starting from a molding composition which contains solid and insoluble particles such as calcium carbonate particles, shaping a film from the molding composition, and stretching the film in longitudinal and/or transverse direction.

German Pat. No. 2,434,726 finally describes a process for preparing thermoplastic rigid films which are based on polyvinyl chloride and are free of surface texture and have low shrinkage, in which process a polyvinyl chloride rigid film prepared by the calendering method and having a thickness of 100 to 1,000μ is subjected to stretching in transverse direction. The transverse stretching is effected by heating the film to 130° to 180° C. and, during the stretching, cooling the film down by 0.5° to 15° C. and maintaining a transverse stretching ratio of 1.2 to 2.

Known polyvinyl chloride films do not have the specific combination of properties which is frequently desirable for the abovementioned applications. German Auslegeschrift No. 1,504,522 and German Pat. No. 2,434,726 furthermore emphasize that, admittedly, an improvement in strength values can be obtained by stretching in the case of thermoplastic plastic films, but it must always be accepted that a film is obtained which has a smooth, lustrous and structure-free surface texture, even when the film was lusterless and textured before stretching.

The object of the invention is therefore to provide a polyvinyl chloride film the surface of which has a certain roughness and at the same time also a certain luster and which has a certain change in dimension (shrinkage) in the transverse direction but no significant change in dimension in the longitudinal direction of the film on the latter being heated up to 140° C., the matt and rough surface effect not being lost by the heating.

Another object of the invention is to make available a process for manufacturing such a film.

The stretched and delustered polyvinyl chloride film according to the invention has (a) a surface having roughness values, measured in accordance with DIN 4,768, of $R_a$ of 1 to 3μ and of $R_z$ of 5 to 15μ, (b) a luster value, measured in accordance with DIN 67,530 at an incident light angle of 85°, of 15 to 70% and (c) a change in dimension, measured in accordance with DIN 53,377, on heating of the film up to 140° C. of −25 to −75% in transverse direction of the film and of less than −10% in longitudinal direction of the film and (d) retains the delustered surface texture on heating up to 140° C.

Preferable films according to the invention have roughness values of $R_a$ of 1.3 to 2.5μ and of $R_z$ of 8 to 12μ, a luster value of 20 to 40% and a change in dimension of −35 to −55% in transverse direction of the film and of less than −7% in longitudinal direction of the film.

The thickness of the films according to the invention is as a rule 0.02 to 0.3 mm, preferably 0.04 to 0.1 mm.

The process according to the invention for manufacturing the new polyvinyl chloride films, in which, starting from a molding composition consisting essentially of a vinyl chloride polymer, lubricant and stabilizer, a film is manufactured which has been calendered with the aid of a calender having at least three rolls, stretched and delustered with one or more delustering rolls, comprising the combination of the following process steps in which (a) the film is taken off the final calender roll with a rate which is approximately equal to up to at most three times as great as the speed of this roll, (b) the film, for delustering, is passed at a temperature of 170° to 220° C. over at least one delustering roll having roughness values measured in accordance with DIN 4,768 of $R_a$ of 2 to 5$\mu$ and of $R_z$ of 15 to 40$\mu$, the delustering rolls used being at least one of the two final calender rolls and/or at least one roll downstream of the calender, and (c) the delustered film is transversely stretched at a temperature of 90° to 130° C. and a ratio of 1:1.3 to 1:4.

In a preferable process the polyvinyl chloride film according to the invention is manufactured by the following process steps (combined in the order indicated):

(a) the film (squeezed from the molding compositions described) is taken off the final calender roll at a speed which is approximately equal to up to at most twice as great as the speed of this roll, (b) the film, for delustering, is passed at a temperature of 180° to 210° C. over at least one delustering roll having roughness values measured in accordance with DIN 4,768 of $R_a$ of 3 to 4$\mu$ and of $R_z$ of 20 to 30$\mu$, the delustering rolls used being at least one of the two final calender rolls and/or at least one roll downstream of the calender, and (c) the delustered film is transversely stretched at a temperature of 100° to 125° C. and a ratio of 1:1.5 to 1:2.5.

Vinyl chloride polymer or polyvinyl chloride is to be understood as meaning not only homopolymers of vinyl chloride but also mixed polymers, such as copolymers and graft polymers of vinyl chloride which have been prepared by the known continuous or batch polymerization processes, for example by the emulsion, suspension and mass polymerization processes. The content of polymerized vinyl chloride in the vinyl chloride copolymers and graft polymers is as a rule at least 50% by weight, preferably at least 85% by weight, relative to the polymer. Examples of monomers suitable for copolymerization with vinyl chloride are olefins, such as ethylene and propylene, vinyl esters of carboxylic acids, such as vinyl acetate and vinyl propionate, acrylonitrile, styrene, and cyclohexylmaleimide.

For graft polymerization it is possible to use, for example, elastomeric polymers of butadiene, ethylene, propylene, styrene and/or acrylonitrile.

Preferable polyvinyl chlorides are homopolymers of vinyl chloride and its copolymers and graft polymers containing at least 85% by weight of polymerized vinyl chloride. The K values (DIN 53,726) of the polyvinyl chlorides are advantageously 50 to 80, preferably 55 to 65.

The polyvinyl chlorides of which the polyvinyl chloride films according to the invention are comprised and from which they are manufactured contain as a rule the customary auxiliaries which are advantageous for processing vinyl chloride polymers, preferably heat stabilizers and lubricants. They can also contain, in addition, special additives, preferably modifying agents for improved impact strength, processing aids and small amounts of fillers and dyestuffs.

The heat stabilizers employed are preferably organotin sulfur compounds, urea and thiourea derivatives and salts of alkali metals and also of zinc with aliphatic carboxylic acids or hydroxycarboxylic acids, if appropriate together with co-stabilizers such as epoxidized soya bean oil and phosphites. Organotin sulfur compounds, such as dimethyltin bis-2-ethylhexylthioglycolate, di-n-butyltin bis-2-ethylhexylthioglycolate and di-n-octyltin bis-2-ethylhexylthioglycolate are preferable. In general, the amount of stabilizer is 0.5 to 3% by weight, preferably 0.7 to 2% by weight, relative to the polyvinyl chloride. The lubricants employed are preferably limed 1,3-butanediol montanic acid ester which has been limed in such a way that about 40% by weight of the montanic acid employed in the liming is present as the calcium salt (OP wax), 1,3-butanediol montanic acid ester (E wax), bis-stearylethylenediamine (C wax), stearic acid and/or fatty acid esters of glycerol. In general, the quantity of lubricant is 0.5 to 3% by weight, preferably 0.5 to 2% by weight, relative to the polyvinyl chloride. The modifying agents used for improved impact strength are preferably acrylonitrile/butadiene/styrene (ABS) resins, methyl methacrylate/acrylonitrile/butadiene/styrene (MABS) resins, methyl methacrylate/butadiene/styrene (MBS) resins, copolymers of ethylene and vinyl acetate, and/or chlorinated polyethylene. The quantity of modifying agent for improved impact strength is generally 2 to 20% by weight, preferably 5 to 15% by weight, relative to the polyvinyl chloride. The processing aids used are preferably polymethyl methacrylates and MBS resins customary as processing aids in an amount of 0.5 to 5% by weight, relative to the polyvinyl chloride.

All those dyestuffs are suitable which are customarily used for coloring polyvinyl chloride films. The amount of dyestuff is generally 0.01 to 5% by weight, relative to the polyvinyl chloride. If the mattness of the film according to the invention is intended to be particularly strongly marked, it is advantageous to add to the molding composition for manufacturing the film fillers which are such that matt and rough polyvinyl chloride films are produced. The fillers used are therefore preferably calcium carbonate (chalk), magnesium silicate (talc), aluminum silicate (kaolin), barium sulfate (baryte) and natural or synthetic silica. Chalk and kaolin are particularly preferable. The mean particle diameter of the fillers is 0.5 to 15$\mu$, preferably 2 to 10$\mu$. The amount of filler is generally 0.1 to 10% by weight, preferably 0.5 to 5% by weight, relative to the polyvinyl chloride. The films according to the invention are preferably free of fillers.

In principle, the films according to the invention can also contain small amounts of primary and/or secondary plasticizers customary for polyvinyl chloride, but preferably they are plasticizer-free.

The molding compositions described are processed into films by calendering on a calender having at least three rolls, preferably four to five rolls. The processing can be carried out using the known high temperature process (mill kneading/calendering) or low temperature process (crumb kneading/calendering). The molding compositions described are preferably calendered using the known high temperature process. In this process, the individual components are first mixed with one another, for example in a conventional high speed mixer. The mixture is then pre-gelled on at least one roll mill and/or in a kneader and squeezed on the calender at roll temperatures of 170° to 220° C., preferably 180° to 210° C., into a film. The calendered film is taken off (drawn off) the final calender roll at a speed which is approximately equal to up to at most three times, preferably up to at most twice, the speed of the final calender roll.

The film is delustered (embossed) with the aid of one or more depolished metal rolls (embossing rolls) which in each case have the roughness values indicated above. The metal rolls, which are preferably steel rolls, are depolished as known in general by blasting with sand (for example with alumina grains) of appropriate grain size.

The film is delustered with the aid of the delustering rolls (embossing rolls) to be used according to the invention using processes which are in themselves known. The delustering step can be carried out at the calender itself (that is during calendering), by means of an embossing unit downstream of the calender, or at the calender (basic embossing) and at an embossing unit (after-embossing). The delustering is preferably carried out at the calender or at the calender and at a downstream embossing unit. Embossing at the calender is obtained by the final or preferably the two final calender rolls being depolished, that is being designed as delustering rolls. When the film squeezed from the molding composition passes over the depolished calender rolls the latter's embossing pattern is transferred to the film which likewise has a temperature of 170° to 220° C., preferably 180° to 210° C. The film thus obtained by calendering and simultaneous embossing has the roughness and luster values indicated. For embossing on a (specific) embossing unit downstream of the calender, an embossing device is advantageously employed which is disclosed in German Offenlegungsschrift No. 2,833,982 and which essentially comprises preferably an embossing roll having the roughness values indicated above and a backing roll (pressure roll). In this device, the calendered polyvinyl chloride film (which has already been given the basic embossing at the calender or is still non-embossed) is passed at a temperature of 170° to 220° C., preferably 180° to 210° C., at a speed of 5 to 100 m/min, preferably 30 to 60 m/min, and an embossing pressure of 100 to 500 N/cm, preferably 250 to 400 N/cm, through the gap of embossing roll and pressure roll. The embossing roll is maintained by heating at film temperature and the pressure roll by cooling at a temperature of up to at most 130° C.

The polyvinyl chloride film according to the invention can be embossed on one side or both sides. It is preferably embossed on one side.

The embossed film is stretched in transverse direction (that is transverse to the machine direction or to the running direction of the film in its manufacture) on devices known for this purpose. Such devices are described, for example, in German Pat. Nos. 1,504,242, 2,024,308 and 2,434,726. Transverse stretching is preferably carried out using the device and procedure described in German Pat. No. 2,434,726. In analogy, the film is transversely stretched with the aid of a so-called tenter at a temperature of 90° to 130° C., preferably 100° to 125° C., in a transverse stretching ratio of 1:1.3 to 1:4, preferably 1:1.5 to 1:2.5, and during the transverse stretching the film web is cooled down by 0.5° to 15° C., preferably 2° to 10° C. The tenter (frame) comprises two profiled rails which enclose between each other a narrow segment parallel to the longitudinal axis (inlet segment), followed by a trapezoidally widening segment (drawing zone) and followed by a wider segment (exit segment) parallel to the longitudinal axis, for the film web. Transverse stretching is specifically effected by heating the film web in the inlet segment to a temperature of 90° to 130° C., preferably 100° to 125° C. The heating is advantageously performed by means of infrared radiators, by an appropriately pre-heated gas, for example by pre-heated air, and/or by passing the film web over one or more appropriately heated rolls. The temperature of the film web can be checked, for example, with the aid of an infrared thermometer. In the transverse drawing zone, the film is tranversely stretched with a stretching ratio of 1:1.3 to 1:4, preferably 1:1.5 to 1:2.5. During transverse stretching, the film web is cooled down by 0.5° to 15° C., preferably by 2° to 10° C. The film is cooled down by these temperatures, for example, by the film web losing a corresponding amount of heat during transverse stretching by radiation and convection. It can also be controlled by a gas, for example air, onto the film web, which gas has a correspondingly lower temperature than the film web heated up in the inlet segment. The transversely stretched film then passes through the outlet segment where it is cooled down, by means of a gas, for example air, chill rolls and/or by radiation, for winding up.

The process according to the invention for manufacturing the new polyvinyl chloride film is composed of individual process steps which, admittedly, are in themselves known, but which, together with the processing measures chosen, and in the present combination, surprisingly lead to the film according to the invention. In the process according to the invention, delustering is first carried out and the delustered film is then transversely stretched, while in the known processes for manufacturing stretched and embossed films, stretching is carried out first (and namely in general not only longitudinally but also transversely) and then embossing. Since, in the process according to the invention, stretching is carried out after delustering, it was therefore not expected that a film is obtained which has a relatively high mattness and roughness, since, after all, German Auslegeschrift No. 1,504,522 and German Pat. No. 2,434,726 specifically emphasize that stretching of thermoplastic plastic films always produces lustrous and smooth surfaces. The delustered and essentially only transversely stretched film manufactured according to the invention from the molding compositions indicated has a specific combination of visual and physical properties. It has a certain matt and rough surface and at the same time a high heat shrinkage (change in dimension) in transverse direction but no significant heat shrinkage in longitudinal direction. It can also be written on and is easily printable, for example with multicolor prints. Owing to all these properties, the film is particularly advantageously used for the specific purposes mentioned at the beginning.

The invention is now illustrated in still more detail by means of examples.

EXAMPLE 1

A molding composition of 100 parts by weight of a vinyl chloride homopolymer having a K value of 55, 1.5 parts by weight of heat stabilizer and 0.7 part by weight of lubricant was mixed in a known and customary manner in a high speed mixer, pre-gelled on a roll mill and squeezed into a film on a 4-roll calender at a temperature of 180° to 210° C. The two final calender rolls were depolished rolls and had the roughness values, each measured in accordance with DIN 4,768, of $R_a = 3.0\mu$ and $R_z = 20\mu$. The film, delustered while running over the two final calender rolls, was drawn off the final calender roll at the 1.5-fold speed, relative to the speed of the final calender roll. The calendered and delustered film was then transversely stretched with the aid of a tenter analogously to the process of German Pat. No. 2,434,726 at a temperature of 125° C. and a stretching ratio of 1:1.6, the temperature of the film being reduced by 5° C. during the stretching. The film thus obtained was 80μ thick and had a uniformly matt appearance and the following properties in respect of roughness, luster and transverse and longitudinal shrinkage: roughness values $R_a$ and $R_z$, in accordance with DIN 4,768: $R_a=2.5\mu$ and $R_z=12\mu$; luster value (reflectometer value) in accordance with DIN 67,530 at an incident light angle of 85°: 20%; transverse shrinkage (transverse change in dimension) at 140° C. for 15 minutes, in accordance with DIN 53,377: −35%; longitudinal shrinkage (longitudinal change in dimension) at 140° C. for 15 minutes, in accordance with DIN 53,377: −4%.

EXAMPLE 2

A molding composition of 100 parts by weight of vinyl chloride homopolymer having a K value of 55, 10 parts by weight of methyl methacrylate/butadiene/styrene polymer as a modifying agent for improved impact strength, 1.5 parts by weight of heat stabilizer and 1.0 part by weight of lubricant was mixed in a known and customary manner in a high speed mixer, pre-gelled in a kneader and squeezed into a film on a 4-roll calender at a temmperature of 185° to 210° C. The final calender roll was a depolished roll having roughness values of $R_a=3.0\mu$ and $R_z=20\mu$ (measured in accordance with DIN 4,768). The film, delustered while running over the final calender roll, was drawn off this roll with the 1.8-fold speed. The calendered and delustered film was then transversely stretched with the aid of a tenter analogously to the process of German Pat. No. 2,434,726 at a temperature of 120° C. and a stretching ratio of 1:2.5, the film being cooled down by 10° C. during the stretching. The film thus obtained was 50μ thick and had a uniformly matt appearance and the following properties in respect of roughness, luster and transverse and longitudinal shrinkage: roughness values $R_a$ and $R_z$ in accordance with DIN 4,768: $R_a=1.3\mu$, $R_z=8\mu$; luster value in accordance with DIN 67,530 at an incident light angle of 85°: 40%; transverse shrinkage at 140° C. for 15 minutes in accordance with DIN 53,377: −55%; longitudinal shrinkage at 140° C. for 15 minutes in accordance with DIN 53,377: −5%.

EXAMPLE 3

A molding composition of 100 parts by weight of a vinyl chloride homopolymer having a K value of 58, 1.5 parts by weight of heat stabilizer and 0.7 part by weight of lubricant was mixed in a known and customary manner in a high speed mixer, pre-gelled in a kneader, and squeezed into a film on a 4-roll calender at a temperature of 185° to 210° C. The two final calender rolls were depolished rolls and had the roughness values, each measured in accordance with DIN 4,768, of $R_a=3.5\mu$ and $R_z=25\mu$. The film, delustered while running over the two final calender rolls, was drawn off the final roll with the 2-fold speed. The calendered and delustered film was then transversely stretched in a customary tenter at a film temperature of 115° C. and a stretching ratio of 1:2. The film thus obtained was 75μ thick and had a uniformly matt appearance and the following properties in respect of roughness, luster and transverse and longitudinal shrinkage: roughness values $R_a$ and $R_z$ in accordance with DIN 4,768: $R_a=2.0\mu$ and $R_z=10\mu$; luster value in accordance with DIN 67,530 at an incident light angle of 85°: 30%; transverse shrinkage at 140° C. for 15 minutes in accordance with DIN 53,377: −50%; longitudinal shrinkage at 140° C. for 15 minutes in accordance with DIN 53,377: −6%.

EXAMPLE 4

A molding composition of 100 parts by weight of a vinyl chloride copolymer containing 10% by weight, relative to the copolymer, of vinyl acetate and having a K value of 60, 15 parts by weight of an acrylonitrile/butadiene/styrene polymer as a modifying agent for improved impact strength, 1.5 parts by weight of heat stabilizer and 1.2 parts by weight of lubricant was mixed in a known and customary manner in a high speed mixer, pre-gelled on a roll mill and squeezed into a film on a 4-roll calender at a temperature of 175° to 200° C. The final calender roll was a depolished roll having the roughness values $R_a=3.0\mu$ and $R_z=20\mu$ (measured in accordance with DIN 4,768). The film was drawn off the final calender roll with the 3-fold speed, relative to the speed of this roll. The film drawn off the calender was passed over customary deflection rolls to an embossing unit mounted after the calender. The embossing unit comprised an embossing roll having roughness values $R_a=2.5\mu$ and $R_z=20\mu$ (measured in accordance with DIN 4,768) and a pressure roll. The embossing was carried out analogously to the process of German Offenlegungsschrift No. 2,833,982. The film was passed at a speed of 50 m/min and at a temperature of 180° C. without looping the embossing roll and the pressure roll (rubber roll) through the embossing gap and embossed under an embossing pressure of 300 N/cm. The embossing roll was heated to a temperature of 180° C., and the pressure roll was cooled with cooling water. The embossed film was transversely stretched in a customary tenter at a film temperature of 95° C. and a stretching ratio of 1:4. The film thus obtained was 40μ thick and had a uniformly matt appearance and the following properties in respect of roughness, luster and transverse and longitudinal shrinkage: roughness values $R_a$ and $R_z$ in accordance with DIN 4,768: $R_a=1.1\mu$ and $R_z=6\mu$; luster value in accordance with DIN 67,530 at an incident light angle of 85°: 50%; transverse shrinkage at 140° C. for 15 minutes in accordance with DIN 53,377: −75%; longitudinal shrinkage at 140° C. for 15 minutes in accordance with DIN 53,377: −8%.

EXAMPLE 5

A molding composition comprised of 100 parts by weight of vinyl chloride homopolymer having a K value of 60, 5.0 parts by weight of titanium dioxide, 1.5 parts by weight of heat stabilizer and 0.7 part by weight of lubricant was squeezed into a film, which was then embossed and stretched, all three steps being carried out as in Example 3, with the calender rolls having a temperature of 185° to 210° C., the depolished calender rolls having an $R_a$ value of 4.0μ and an $R_z$ value of 30μ, the film being drawn off the final calender roll with the 1.3-fold speed, and the transverse stretching of the delustered film being carried out at a temperature of 130° C. with a stretching ratio of 1:1.3. The film obtained was 100μ thick and had a uniform white-matt appearance and the following properties in respect of roughness, luster and transverse and longitudinal shrinkage: roughness values $R_a$ and $R_z$ in accordance with DIN 4,768: $R_a=3.0\mu$ and $R_z=15\mu$; luster value in accordance with DIN 67,530 at an incident light angle of 85°: 15%; transverse shrinkage at 140° C. for 15 minutes in accordance with DIN 53,377: −25%; longitudinal shrinkage at 140° C. for 15 minutes in accordance with DIN 53,377: −3%.

EXAMPLE 6

Example 4 was followed with the difference that the embossing roll of the embossing unit had roughness values of $R_a=2\mu$ and $R_z=15\mu$. The film obtained was $40\mu$ thick and had a uniformly matt (silky-matt) appearance and the following properties in respect of roughness, luster and transverse and longitudinal shrinkage: roughness values $R_a$ and $R_z$ in accordane with DIN 4,768: $R_a=1\mu$ and $R_z=5\mu$; luster value in accordance with DIN 67,530 at an incident light angle of 85°: 70%; transverse shrinkage at 140° C. for 15 minutes in accordance with DIN 53,377: −75%; longitudinal shrinkage at 140° C. for 15 minutes in accordance with DIN 53,377: −8%.

We claim:

1. A stretched and delustered polyvinyl chloride film, which has
    (a) a surface having roughness values, measured in accordance with DIN 4,768, of $R_a$ of 1 to $3\mu$ and of $R_z$ of 5 to $15\mu$,
    (b) a luster value, measured in accordance with DIN 67,530 at an incident light angle of 85°, of 15 to 70% and
    (c) a change in dimension, measured in accordance with DIN 53,377, on heating of the film up to 140° C. of −25 to −75% in transverse direction of the film and of less than −10% in longitudinal direction of the film, and which
    (d) retains the delustered surface texture on heating up to 140° C.

2. A polyvinyl chloride film as claimed in claim 1, which has roughness values of $R_a$ of 1.3 to $2.5\mu$ and of $R_z$ of 8 to $12\mu$, a luster value of 20 to 40% and a change in dimension in transverse direction of −35 to −55% and in longitudinal direction of less than −7%.

3. A polyvinyl chloride film as claimed in claim 2, which has a thickness of 0.04 to 0.1 mm.

4. A process for manufacturing a stretched and delustered polyvinyl chloride film, in which, starting from a molding composition consisting essentially of a vinyl chloride polymer, lubricant and stabilizer, a film is manufactured which has been calendered with the aid of a calender having at least three rolls, stretched and delustered with one or more delustering rolls, comprising the combination of the following process steps in which
    (a) the film is taken off the final calender roll with a rate which is approximately equal to up to at most three times as great as the speed of this roll,
    (b) the film, for delustering, is passed at a temperature of 170° to 220° C. over at least one delustering roll having roughness values measured in accordance with DIN 4,768 of $R_a$ of 2 to $5\mu$ and of $R_z$ of 15 to $40\mu$, the delustering rolls used being at least one of the two final calender rolls and/or at least one roll downstream of the calender, and, subsequently,
    (c) the delustered film is transversely stretched at a temperature of 90° to 130° C. and a ratio of 1:1.3 to 1:4; the resulting stretched and delustered film having:
        (a) a surface having roughness values, measured in accordance with DIN 4,768, of $R_a$ of 1 to $3\mu$ and of $R_z$ of 5 to $15\mu$,
        (b) a luster value, measured in accordance with DIN 67,530 at an incident light angle of 85°, of 15 to 70% and
        (c) a change in dimension, measured in accordance with DIN 53,377, on heating of the film up to 140° C. of −25 to −75% in transverse direction of the film and of less than −10% in longitudinal direction of the film and
        (d) the ability to retain the delustered surface texture on heating up to 140° C.

5. The process as claimed in claim 4, wherein
    (a) the film is taken off the final calender roll at a speed which is approximately equal to up to at most twice as great as the speed of this roll,
    (b) the film, for delustering, is passed at a temperature of 180° to 210° C. over at least one delustering roll having roughness values measured in accordance with DIN 4,768 of $R_a$ of 3 to $4\mu$ and of $R_z$ of 20 to $30\mu$, the delustering rolls used being at least one of the two final calender rolls and/or at least one roll downstream of the calender, and
    (c) the delustered film is transversely stretched at a temperature of 100° to 125° C. and a ratio of 1:1.5 to 1:2.5.

6. The process as claimed in claim 4, wherein the film is delustered at the two final calender rolls.

7. The process as claimed in claim 4, wherein the film is delustered at the two final calender rolls and at an embossing unit which is downstream of the calender and which comprises a delustering roll and a pressure roll.

8. The process as claimed in claim 4, wherein the resulting stretched and delustered film has roughness values $R_a$ of 1.3 to $2.4\mu$ and $R_z$ of 8 to $12\mu$, a luster value of 20 to 40% and a change in dimension in transverse direction of −35 to −55% and in longitudinal direction of less than −7%.

9. The process as claimed in claim 8, wherein the resulting stretched and delustered film has a thickness of 0.04 to 0.1 mm.

10. A stretched and delustered polyvinyl chloride film made according to the process of claim 4.

* * * * *